United States Patent [19]

Lindgren

[11] 4,172,479
[45] Oct. 30, 1979

[54] METHOD AND APPARATUS FOR USE IN CONNECTION WITH FELLING OF TREES

[75] Inventor: Mats Lindgren, Stockholm, Sweden

[73] Assignee: Nordfor AB, Säter, Sweden

[21] Appl. No.: 720,604

[22] Filed: Sep. 7, 1976

[30] Foreign Application Priority Data

Apr. 14, 1976 [SE] Sweden ............................ 76044239

[51] Int. Cl.² ........................ A01G 23/08; F02G 5/02
[52] U.S. Cl. .................................. 144/34 B; 60/597;
144/309 AC; 254/93 HP
[58] Field of Search ............ 144/34 R, 34 B, 309 AC;
254/104, 93 HP; 417/380; 60/597

[56] References Cited

U.S. PATENT DOCUMENTS

| | | | |
|---|---|---|---|
| 795,531 | 7/1905 | Michelin | 417/380 |
| 1,516,816 | 11/1924 | Hawkins | 417/380 |
| 2,140,325 | 12/1938 | Morse | 254/93 HP |
| 2,226,201 | 12/1940 | Freyssinet | 254/93 HP |
| 2,495,092 | 1/1956 | Cox et al. | 254/93 HP |
| 2,657,904 | 11/1953 | Evenson | 254/104 |
| 3,026,541 | 3/1962 | Murat | 254/93 HP |
| 3,822,861 | 7/1974 | Scott | 254/104 X |

FOREIGN PATENT DOCUMENTS

2446432 5/1975 Fed. Rep. of Germany.
202679 3/1966 Sweden ................................. 144/34 B

*Primary Examiner*—Robert Louis Spruill
*Assistant Examiner*—W. D. Bray
*Attorney, Agent, or Firm*—Frishauf, Holtz, Goodman, Woodward

[57] ABSTRACT

A method and apparatus for use in tree felling for causing a tree to tip under the influence of a force acting on the cutting surfaces of a saw notch in the tree trunk. The tipping force is produced by means of an inflatable cushion which is inserted in a flattened state into the saw notch and connected to the combustion chamber of the cylinder of the power saw motor to be inflated with compressed gas from said combustion chamber.

18 Claims, 6 Drawing Figures

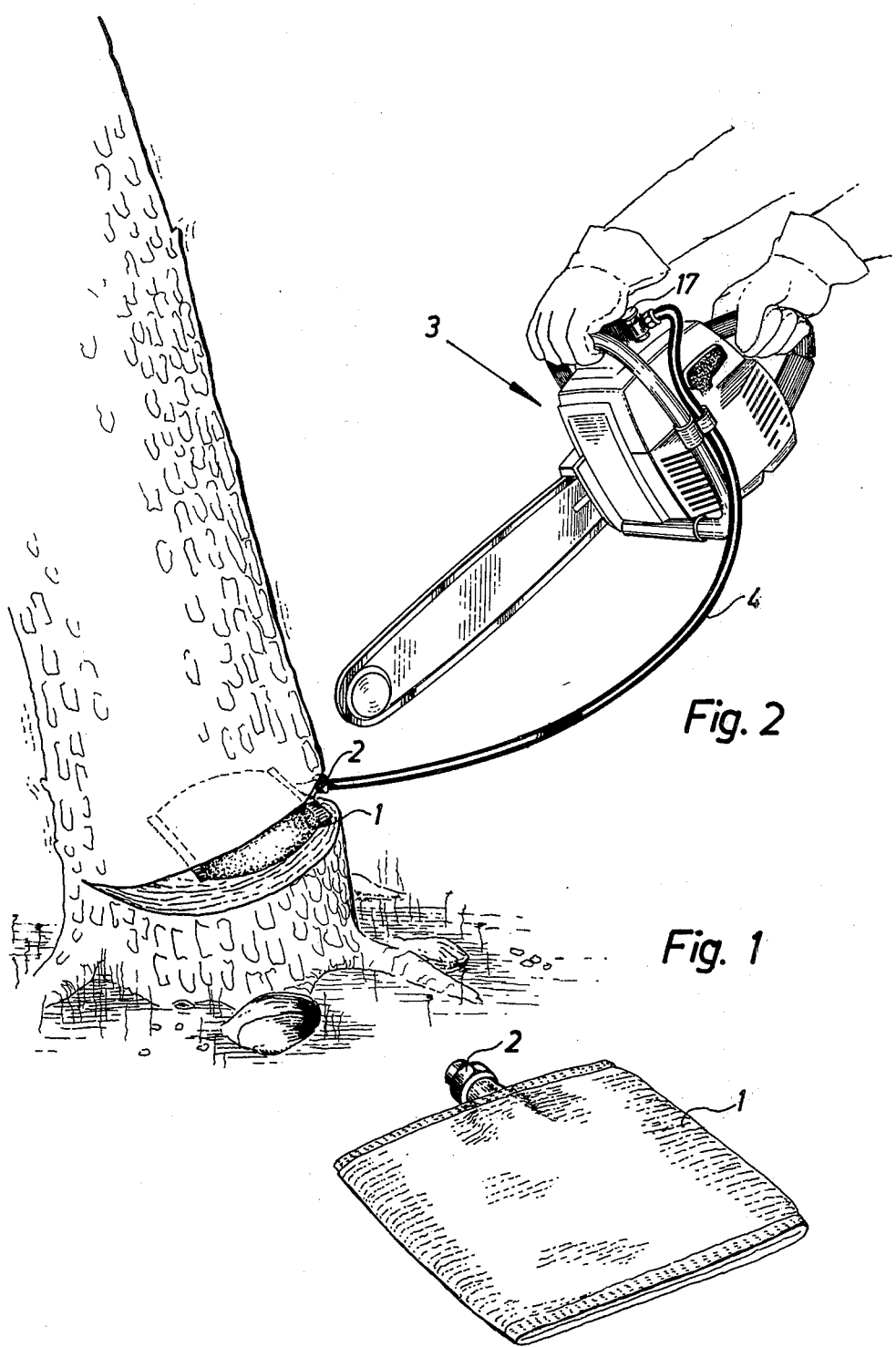

METHOD AND APPARATUS FOR USE IN CONNECTION WITH FELLING OF TREES

This invention relates to a method for use in the felling of trees, and more particularly to a method of obtaining a necessary tipping force after the intended sawing or corresponding operations have been carried out. The invention also relates to an apparatus for use when carrying out the method.

At logging operations so-called felling wedges increasingly are used in connection with tree felling. These wedges are forced into the saw notch in order to effect a desired tipping force. Known felling wedges are intended either to be driven in manually by means of mechanical members or they are driven in hydraulically. Usually the hydraulic force is produced by a manual pumping operation. Wedges of this last mentioned type work satisfactorily, but are relatively heavy to carry. Moreover, they require a bulky and heavy additional equipment, which the operator must carry together with the power saw.

These problems are solved according to the invention by utilizing a very simple, light-weight device, which requires only little space and can replace conventional felling wedges. A highly advantageous property of said device is that it renders possible the utilization of the engine of a power saw as a drive source.

SUMMARY OF THE INVENTION

According to a first aspect of the invention, in tree felling, the necessary tipping force is effected by utilizing a cushion, which is expandable by inflation and connected to a pressure fluid source and preferably acts directly on one of the cutting surfaces in the tree trunk. To attain this object, the cushion is inserted in a flattened state into a saw or corresponding notch and thereafter connected to said pressure fluid source. Alternatively, however, the cushion can be caused to act on said cutting surface via lever means.

In order to reduce the additional equipment to be taken along by the operator, it is preferred to utilize as said pressure fluid source the combustion chamber of the cylinder of the engine of the power saw used for making the cutting surfaces in the tree trunk. Preferably, the cushion is connected to the cylinder via a check valve.

According to a second aspect of the invention, apparatus for producing tipping force during felling of trees, comprises a cushion expandable by inflation which is provided with conduit means for connection to a pressure fluid source and which is capable upon inflation to apply a necessary tipping force to at least one cutting surface made in the tree trunk by sawing or corresponding operation. In order to bring about a direct action on the cutting surface, the cushion preferably is designed so as to be insertible in a flattened state into a sawing notch in the tree trunk. Alternatively, however, the necessary tipping moment produced by the cushion can be applied to said cutting surface by means of lever means connected to the cushion.

According to a preferred embodiment, the cushion is adapted for connection to the combustion chamber of the cylinder of the engine of the power saw used for making the cutting surfaces in the tree trunk. Preferably, the cushion is connected to the cylinder via a check valve provided in a passage extending from the cylinder and downstream of a cut-off valve. No equipment, therefore, is required for inflating the cushion beyond such normally taken along by the operator, viz. the power saw.

The invention in its simplest form, thus, requires the operator in addition to the ordinary power saw to carry only a cushion, which is very light and in a flattened state requires little space, and a conduit to connect the cushion to the power saw. The cylinder of the engine already at its manufacture is provided with a valve mechanism for connection of the conduit for use in inflating and deflating the cushion, respectively. Due to the fact that only a conduit connection is required between the cushion and the power saw, the invention further permits the operator to stay at safe distance from the tree while it is being tipped.

The invention is described in greater detail in the following with reference to the accompanying drawings.

BRIEF DESCRIPTION OF THE DRAWINGS

FIG. 1 shows a cushion according to the invention.

FIG. 2 illustrates a preferred method of applying and utilizing the cushion.

DETAILED DESCRIPTION

Figure 6:
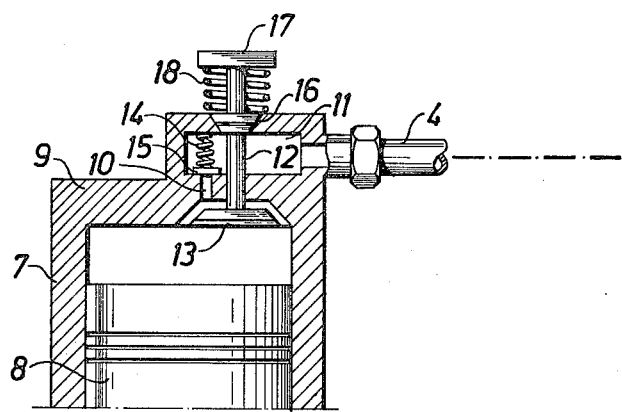
FIG. 6 shows valve means assembled with the power saw motor cylinder.

The cushion 1 shown in FIG. 1, for example, may comprise an inner gas-tight bag, which is provided with connection means 2 and enclosed in a strong casing, for example of nylon cord. The cushion preferably is manufactured so thin that in its flattened state it is insertible into a normal sawing notch. The thickness should not exceed 6 mm.

FIG. 2 shows a preferred application of the cushion 1 for producing a necessary tipping moment at tree felling. The cushion is inserted into a saw notch in the tree trunk made by the power saw 3. Preferably, a directional notch (not shown) is provided on the opposed side of the tree. The cushion in this application acts directly against the cutting surfaces and, therefore, by itself must produce the necessary tipping moment, which often requires a lifting force of several thousand kp. This requires a relatively high pressure in the cushion. According to the invention, the cushion can be inflated to the necessary pressure by drawing compressed gas from the power saw motor cylinder, which will be described in greater detail below with reference to FIG. 6. As the saw motor can be utilized for inflating the cushion, the only step required is to provide a hose 4 between the cushion 1 applied in the sawing notch and the saw motor. When then the saw motor is started, the cushion can be inflated to such a pressure that a sufficient tipping force will act on the cutting surfaces in the tree. As already mentioned, due to the hose connection the operator can at this stage be at safe distance from the tree.

Figure 3:
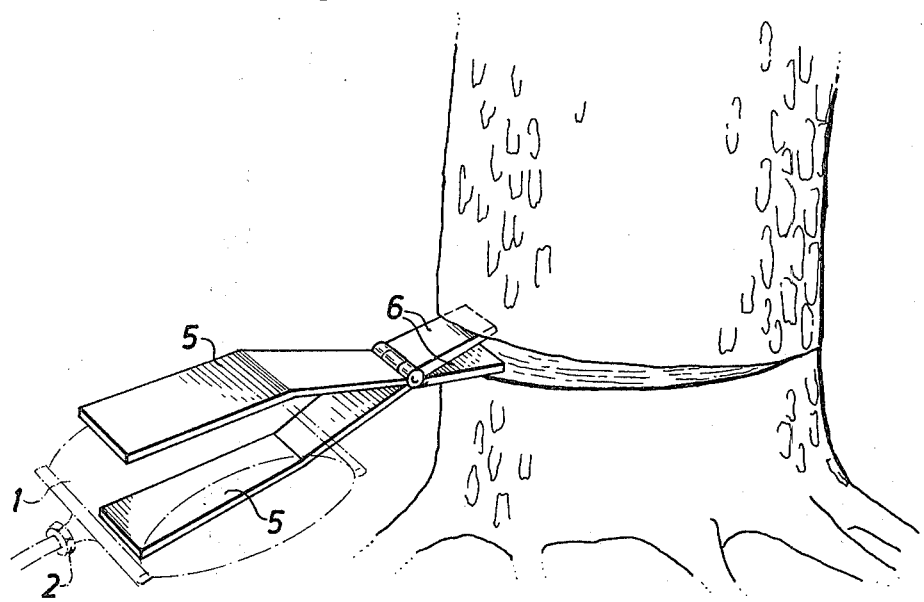
FIGS. 3–5 illustrate in a schematic manner alternative methods of applying the cushion.
Figure 4:
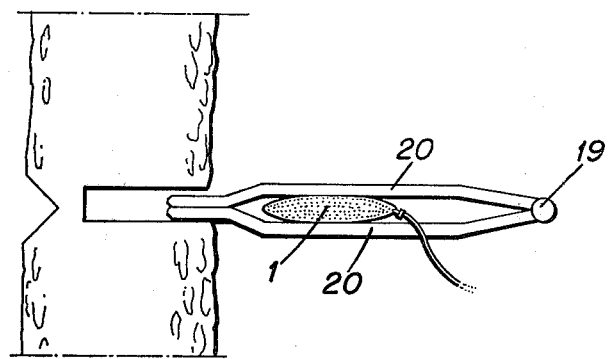
Figure 5:
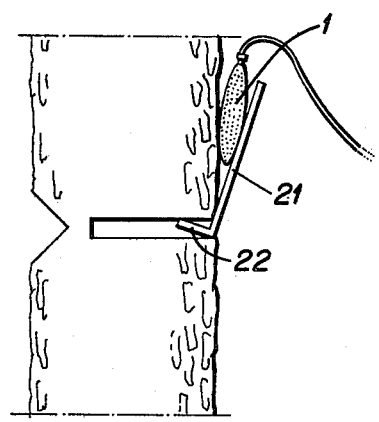

In the embodiment shown in FIGS. 3–5 the cushion itself is not inserted into the saw notch, but the tipping force is transferred to the cutting surfaces via lever means. According to FIG. 3 a device resembling a pair of tongs is used, and the cushion 1 is positioned between the two long legs 5 while the short legs 6 are inserted into the saw notch. Upon expansion of the cushion during its inflation, the legs 5 will move away from each other and transfer necessary tipping force to the cutting surfaces in the tree trunk.

In FIG. 4 a variant of the device according to FIG. 3 is shown, in which the cushion 1 is arranged ahead of the joint 19 between two elongated legs 20.

The device illustrated in FIG. 5 resembles closely a conventional crowbar, which comprises two fixed legs 21 and 22 forming a given angle with each other. The cushion 1 is placed between the long leg 21 and the tree trunk.

The embodiments shown in FIGS. 3-5 require additional implements, but they offer among other things the advantage of rendering it possible to obtain, due to the lever effect, a desired power ratio, whereby the demand on the cushion pressure possibly can be reduced. These devices, besides, permit the application of larger cushions, because the area of the tree trunk (and cutting surface) is no longer a limiting factor. This also contributes to a lowering of the cushion pressure demand. Compared with the case in which the cushion is inserted directly into the saw notch, also the lifting height can be increased.

In FIG. 6 is shown in a schematic manner how compressed gas can be drawn from the motor cylinder for inflating the cushion 1. The motor cylinder is designated by 7 and the associated piston by 8. In the cylinder head 9 a valve seat is provided, from which a passage 10 extends upward into a chamber 11 prepared for connection with the hose 4 leading to the cushion 1.

A valve disc 13 connected to a valve spindle 12 fits into said valve seat. The passage 10 is closed by means of a check valve 15 loaded by a spring 14. The valve spindle 12 is provided with a further valve disc 16 fitting into a valve seat in the upper wall of the chamber 11. A button 17 is provided for the operation of the valve spindle and can be depressed against the action of a spring 18.

In the position shown the button 17 is held depressed, which corresponds to a completed sawing operation and desired inflation of a cushion connected to the saw motor. The valve being in the position shown, the gas pressure in the cylinder 7 opens the check valve 15 during the compression stroke of the piston 8 after the compression has assumed a value predetermined by the spring bias, and gas is thereby supplied to the cushion 1 via the chamber 11 and hose 4. The cushion, thus, is supplied with a certain amount compressed gas during each of the working cycles of the motor. These amounts decrease as the pressure in the cushion increases. The gas mass and the pressure thereof supplied to the cushion during each working cycle, thus, depend on the total load on the check valve 15. In order to permit adjustment to varying conditions, the spring 14 can be provided with means for controlling its spring force. The cushion volume and gas pressure are to be chosen so that necessary inflation of the cushion is achieved as rapidly as possible. It has been found possible, for example, without disturbance of the motor function to inflate a cushion with an area of 150 cm$^2$ within about 10 seconds to a pressure of 20 bar providing a maximum force of about 3000 kp. Assuming that the cushion was inflated to the desired pressure and as a result thereof the tree in question has been felled, the operator releases the button 17, and the power saw again is ready for use in a subsequent sawing operation. Upon release of the button 17, the spring 18 presses the valve spindle 12 with the valve discs 13 and 16 upward, and thereby the passage 10 is closed. The cylinder then will operate in conventional manner. The upward movement of the valve disc 16 further implies that the cushion 1 is evacuated via the hose 4, the chamber 11 and the gap formed between the valve disc 16 and the corresponding valve seat. The cushion can thus be flattened entirely and again be inserted into a saw notch as soon as the next sawing operation is completed.

The invention thus shows several advantages, most of which are due to the simple design and low weight of the device for producing the necessary tipping moment and to the possibility of driving the device from the saw motor. The device does not comprise movable parts except for the valve mechanism associated with the motor cylinder.

The above description is based on the assumption of first performing a desired saw notch and thereafter causing a tipping force to act on the cutting surfaces. It may, however, prove advantageous to permit a tipping force to act also at least during the final phase of the sawing operation. In practical work, the cushion or associated means can be inserted into the saw notch as soon as the notch is sufficiently large, whereafter the sawing can continue until the tree starts falling. The valve in the cylinder can be designed so as to remain in a depressed position and may, for example, be adapted to maintain the pressure in the cushion constant at a preset value.

In order to effect rapid evacuation and complete flattening of the cushion 1, the conduit 4 can be adapted for connection to a space with underpressure in the motor or to an ejector nozzle provided in the exhaust passage.

The invention also in its remaining parts can be varied in several respects, in which connection, for example, the form of the cushion can be varied as desired. At the sawing of so-called pointed timber for example, the cushion suitably may be given a triangular or parallel-trapezoidal form. The device for drawing gas pressure from the cylinder may also be varied, for example by positioning the check valve in the cylinder head and a three-way valve in the passage between the check valve and the cushion. The embodiment shown in FIG. 6, however, has the advantage, that the high temperature in the cylinder does not act directly on the check valve and the associated spring when gas is not drawn from the cylinder. The spring bias of the check valve may be omitted whereby among other things a higher pressure in the cushion can be obtained. A flexible casing for the cushion offers the advantage of good engagement with the uneven cutting surfaces. The cushion, however, if desired can be provided with a sheet metal lining on the upper and lower surfaces thereof, or only on one of these surfaces. This metal sheet may be grooved or provided with other means for effecting good engagement with the associated cutting surface in the tree trunk. The term cushion in this connection is to be understood to refer to different devices which, independently with respect to form and structure, can be expanded by inflation with a pressure medium, such as compressed gas or pressure oil. The spreadout form of the cushion shown in the drawing provides among other things the advantage that necessary tipping force can be obtained at moderate cushion pressure.

What is claimed is:

1. A method for use in tree felling for causing a large tree to tip due to a force acting on at least one cutting surface in the tree trunk, comprising:

forming a cut partially through the tree trunk, said cut defining at least one cutting surface in the tree trunk;

inserting at least a portion of a tipping force producing means into said cut and adjacent said at least one cutting surface, said tipping force producing means including an inflatable cushion;

connecting said inflatable cushion to the combustion chamber of a cylinder of an internal combustion engine by means of a conduit;

controlling the inflation of said inflatable cushion by controlling the feed of compressed gas from said combustion chamber by means of a valve coupled to said conduit for producing a tipping force on said at least one cutting surface sufficient to fell the large tree; and unidirectionally controlling the feed of compressed gas from said combustion chamber to said inflatable cushion by means of a check valve coupled to said conduit between said combustion chamber and said inflatable cushion.

2. A method according to claim 1, comprising forming said cut and said at least one cutting surface in the tree trunk with an engine-driven power saw; and inflating said cushion with compressed gas from a cylinder of the engine of said power saw.

3. A method according to claim 1, comprising inserting said cushion in a flattened state into said cut in said tree trunk before said cushion is inflated with gas from said cylinder of said engine.

4. A method according to claim 1, wherein said tipping force producing means includes a lever means coupled to said cushion, and comprising inserting at least a portion of said lever means into said cut; and applying the tipping force produced by inflation of said cushion to said cutting surface by means of said lever means.

5. A method according to claim 4, wherein said lever means includes first and second legs oriented at an angle relative to each other, comprising inserting at least a portion of the first leg into said cut; interposing said cushion between said second leg and a surface of the tree trunk; and then inflating said inflatable cushion.

6. A method according to claim 4, wherein said lever means includes first and second leg portions, and comprising interposing said cushion between two of said leg portions, and then inflating said cushion.

7. A method according to claim 4, wherein said lever means includes two interconnected lever arms, and comprising interposing said cushion between said two arms prior to inflation thereof.

8. A method according to claim 1 comprising feeding said compressed gas, in a compressed state, from said combustion chamber to said cushion for inflating said cushion.

9. Apparatus for producing a tipping force to a cutting surface in a notch, or the like, in a tree trunk in large tree felling, comprising:

tipping force producing means including an inflatable cushion for applying a tipping force to at least one cutting surface in the tree trunk upon inflation of said cushion;

conduit means for connecting said cushion to the combustion chamber of a cylinder of an internal combustion engine for feeding compressed gas in a compressed state from said combustion chamber to said cushion;

valve means coupled to said conduit means for controlling the inflation of said cushion by controlling the feed of compressed gas from said combustion chamber to said cushion to sufficiently inflate said cushion to produce a tipping force to fell the large tree; and a check valve coupled to said conduit means between said cushion and said combustion chamber for connection of said cushion to said combustion chamber via said check valve and said valve means.

10. Apparatus according to claim 9, wherein said check valve is provided in a passage extending from said cylinder and downstream of said valve means.

11. Apparatus according to claim 10, wherein said valve means is a cut-off valve.

12. Apparatus according to claim 9, wherein said apparatus includes said engine, said engine being the engine of a power saw used to make said cutting surface in said tree trunk.

13. Apparatus according to claim 9, wherein said apparatus includes said engine, said engine being the engine of a power saw used to make said cutting surface in said tree trunk.

14. Apparatus according to claim 9, wherein said cutting surface is a surface of a saw notch in said tree trunk, and wherein said cushion is, in a flattened state, insertible into said saw notch in said tree trunk.

15. Apparatus according to claim 9, wherein said tipping force producing means comprises lever means coupled to said cushion for applying said tipping force produced by inflation of said cushion to said cutting surface.

16. Apparatus according to claim 15, wherein said cutting surface is a surface of a saw notch in said tree trunk, and wherein said lever means comprises a first rigid leg portion and a second rigid leg portion rigidly extending at an angle from said first leg portion, one of said leg portions being adapted to be inserted into said saw notch in said tree trunk, said cushion being interposed between a surface of said tree trunk and the other of said leg members for applying said tipping force to said cutting surface upon inflation of said cushion.

17. Apparatus according to claim 15, wherein said cutting surface is a surface of a saw notch in said tree trunk, and wherein said lever means comprises first and second leg portions pivotally connected together and a portion of said first and second leg portions being adapted to be inserted into said notch in said tree trunk, said cushion being interposed between said first and second leg portions for spreading same and applying said tipping force to said cutting surface upon inflation of said cushion.

18. Apparatus according to claim 17, wherein said first and second leg portions are pivotally connected at an intermediate portion thereof.

* * * * *